United States Patent [19]

Powell et al.

[11] Patent Number: 4,499,600
[45] Date of Patent: Feb. 12, 1985

[54] SUPERVISION OF TRANSMISSION SYSTEMS

[75] Inventors: William H. Powell, Sawbridgeworth, England; Hugo F. J. Witters, Berlaar, Belgium

[73] Assignee: International Standard Electric Corporation, New York, N.Y.

[21] Appl. No.: 487,237

[22] Filed: Apr. 27, 1983

Related U.S. Application Data

[63] Continuation of Ser. No. 278,133, Jun. 29, 1981, abandoned.

[30] Foreign Application Priority Data

Aug. 26, 1980 [GB] United Kingdom ............. 8027564

[51] Int. Cl.³ .............................................. H04B 9/00
[52] U.S. Cl. ................................ 455/9; 179/175.31 R; 370/74; 370/75; 370/98; 455/601
[58] Field of Search ........................ 455/9, 23, 601; 179/175.31 R; 370/74, 75, 98

[56] References Cited

U.S. PATENT DOCUMENTS

| 3,311,714 | 3/1967 | Howson | 179/175.31 R |
| 4,211,920 | 7/1980 | Wakabayashi | 455/601 |
| 4,249,264 | 2/1981 | Crochet et al. | 455/612 |

FOREIGN PATENT DOCUMENTS 74247 6/1980 Japan ....................................... 455/9

Primary Examiner—Joseph A. Orsino, Jr.
Attorney, Agent, or Firm—John T. O'Halloran; Peter R. Ruzek

[57] ABSTRACT

In a repeater for a communication system a continuously running local oscillator (P) injects a pilot tone into the repeater input, ahead of all the non-linear functions. The repeater may include an input amplifier 1, a reshaping amplifier 2 and an output amplifier 3. The pilot frequency is unique to the repeater and is sufficiently close to the clock frequency in a digital system or the carrier frequency in an analogue system to allow the pilot to pass through all the repeater filters. The pilot effects a small phase modulation of the carrier or clock. Measurement of the amount of phase modulation and also the pilot amplitude at the receiving terminal indicates degradation or failure of the system performance. The pilot frequency is used to identify the repeater.

10 Claims, 3 Drawing Figures

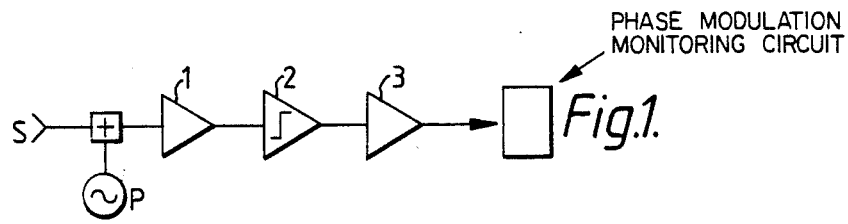
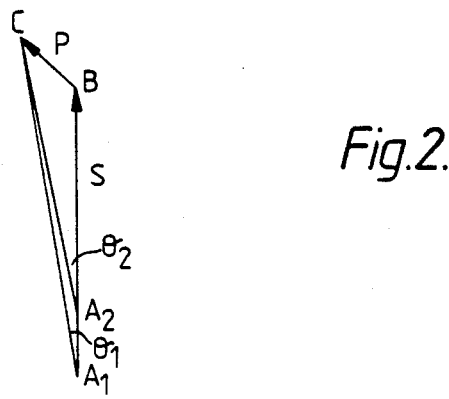
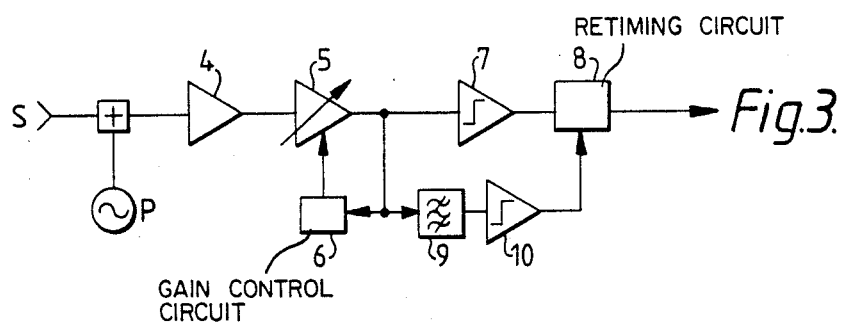

SUPERVISION OF TRANSMISSION SYSTEMS

This application is a continuation of application Ser. No. 278,133, filed June 29, 1981 now abandoned.

FIELD OF THE INVENTION

This invention relates to transmission systems using repeaters, and in particular to a method and means for the supervision of the repeaters in such systems.

Transmission systems for most communications applications must provide means for identifying facility equipment. It is also useful to be able to monitor remotely the quality of system performance at various points in the system to give early warning of system degradation.

Transmission systems, especially those operating in the time domain, i.e. pcm systems, commonly utilize two types of repeaters, those which merely amplify and re-shape the signals and those which also re-time the digital signals. The simpler first type can carry digital or frequency modulated traffic over a wide range of speeds but cannot span such great distances, at least in digital systems, as the second type which is designed for the transmission of digital traffic only at a specified bit rate.

SUMMARY OF THE INVENTION

The invention makes use of pilot tones for supervisory purposes. It is known to use pilot tones in systems in which each repeater is provided with a so-called "loop back" facility. A pilot tone is transmitted from a terminal station and each repeater in turn forms a loop back from the sending to the receiving channel whereby the pilot tone is returned to the terminal where the received tone is monitored. Such a system requires a fairly complex switching facility in each repeater to provide the loop back function. Moreover, supervision of the system requires interruption of the traffic.

According to the present invention there is provided a method of supervising a communications transmission system having one or more repeaters comprising adding to the received signals in the or each repeater at a point in advance of all the non-linear functions in the repeater a pilot tone unique to the or each repeater, the frequency or frequencies of the pilot(s) being such that when operated on by the circuits within the repeater produces a frequency or frequencies near to the clock frequency or carrier frequency of the system and hence passes through all following repeater filters.

The invention also provides a repeater for a communications transmission system including means for adding to the received signals ahead of the non-linear functions in the repeater a pilot tone unique to the repeater, the frequency or frequencies of the pilot(s) being such that when operated on by the circuits within the repeater produces a frequency or frequencies near to the clock frequency or carrier frequency of the system and hence passes through all following repeater filters.

BRIEF DESCRIPTION OF THE DRAWING

Embodiments of the invention will now be described with reference to the accompanying drawings, in which:

FIG. 1 illustrates a repeater having amplifying and re-shaping facilities only.

FIG. 2 is a vector diagram, and

FIG. 3 illustrates a repeater having amplifying, re-shaping and re-timing facilities.

DETAILED DESCRIPTION OF THE INVENTION

The basic repeater illustrated in FIG. 1 comprises an input amplifier 1, a limiting amplifier 2 for reshaping the received signals, and an output amplifier 3. Such a repeater can carry either digital traffic, e.g. time division multiplexed pcm channels, or analog traffic, e.g. frequency division multiplexed channels. In each case there is a fundamental or basic frequency around which the system operates. In the time domain it is the clock frequency and in the frequency domain it is the carrier frequency. In either case a local oscillator P is included in the repeater. The local oscillator is a continuously running oscillator the frequency of which is close to but not actually at that of the clock or carrier frequency and is unique to the repeater. Suppose that the incoming signals contain a spectral component S represented by the rotating vector AB in FIG. 2. The pilot tone P is added to S prior to the reshaping amplifier 2 or the input amplifier 1 and is represented by the rotating vector BC in FIG. 2.

The resultant vector AC is modulated in phase by an amount $\theta_1$. The reshaping amplifier 2 removes amplitude variation of the signal, but the phase modulation $\theta_1$ is preserved and transmitted via subsequent repeaters to the receiving terminal of the system where it can be observed on a selective signal strength meter. The reshaping process is non-linear and consequently produces a spectrum of tones due to non-linear mixing between the pilot P and spectral line S.

These will occur in pairs at frequencies above and below S and represent phase modulation impressed on S by pilot P. The presence of P at the repeater may be confirmed by measuring the phase modulation impressed on S, or by measuring a spectral line due to the non-linear mixing of S and P. Inspection of FIG. 2 shows that if signal S decreases from $A_1B$ to $A_2B$ in magnitude, the phase modulation increases from $\theta_1$ to $\theta_2$. Measurement of either this phase modulation or one of its spectral components will consequently reveal any variation from nominal received signal strength. If the signal S were to cease altogether, the reshaping amplifier 2 would act on the pilot P so that a very large signal of frequency P instead of S would be received at the system terminal. This can initiate an alarm, and the frequency of the received tone P will indicate the part of the system where the fault has occurred, because each repeater has its own unique frequency. Certain types of signal disturbance such as variation in the strength of signal by electro-magnetic interference from power cables can also be identified, since these variations will be impressed on the phase modulation. It would also be possible to modulate the pilot P to provide an auxiliary channel carrying information about the condition of the equipment or for a speech service channel during equipment maintenance.

The digital repeater shown in FIG. 3 comprises an input amplifier 4, a gain control amplifier 5, a gain control circuit 6, a reshaping amplifier 7 and a retiming circuit 8. A bandpass filter 9 is used to extract the clock frequency and is followed by a limiting amplifier 10. The pilot frequency oscillator P is again inserted at the input to the repeater. The frequency of P is close to the clock frequency component S so that S&P pass through the bandpass filter 9. The limiting amplifier 10 impresses phase modulation on the clock in the same manner previously described with reference to FIG. 2. In some repeaters a phase locked loop is used instead of a filter and a limiting amplifier. In this case the pilot P disturbs the phase detector and produces phase modulation of the clock signal also. The phase locked loops of the repeaters have a bandwidth analogous to that of bandpass filter 9. The pilot P must be sufficiently close to the clock frequency S to pass through this bandwidth. In the repeater of FIG. 3 the automatic gain control circuit 6 controls the gain of amplifier 5 so that a constant signal level is obtained at the output of amplifier 5. If the level of S decreases at the repeater input, the gain of amplifier 5 increases, and in so doing it increases the level of P that enters the clock extraction circuitry 9 and 10, thereby increasing the degree of phase modulation impressed on the clock.

Some repeaters do not contain automatic gain control, but rely instead on making amplifier 5 a limiting amplifier analogous to limiting amplifier 2 in FIG. 1. In this case operation is more closely analogous to that of FIG. 1.

The effects observed for FIG. 3 are consequently very similar to those for FIG. 1. If signal S ceases the clock extraction circuit will again be dominated by P so that a large signal of this frequency will arrive at the receiving terminal where it can initiate an alarm and identify the location of the fault. This conclusion is unchanged for different variations of implementation.

In summary, it is shown that faults can be located and signal levels monitored in a system of repeaters which provide either full regeneration (FIG. 3) or partial regeneration (FIG. 1), by adding a unique continuous pilot tone to each repeater ahead of its non-linear circuitry. This can be used to supervise either type of repeater carrying digital traffic, or a repeater having partial regeneration, such as FIG. 1, carrying analog information on a frequency modulated signal.

The invention is also applicable to repeated optical fibre systems. In this case the local oscillator P can be used to drive digitally a local light source, e.g. a light emitting diode, which illuminates the same photodetector as the optical signals input from the incoming optical fibre. In all other respects the invention operates in the same manner as for electrical transmission systems. It is applicable not only to land line systems but also submarine systems, where the facility of remote supervision is even more desirable.

We claim:

1. A method of supervising a communications transmission system in which signals propagating in a predetermined direction in a transmission path from a transmitting to a receiving terminal are modified by at least one repeater which is interposed in the transmission path and includes at least one component that performs a non-linear function on the signal reaching the same, comprising the steps of summing the incoming signal propagating in the transmission path toward the repeater and having a predetermined frequency at a point situated ahead of the one component as considered in the predetermined direction with a pilot signal for combining with said incoming signal prior to the performance of the non-linear function on the combined signal, said pilot signal having such a frequency that said combined signal has a frequency component close to but different from said predetermined frequency, with attendant phase modulation of the outgoing signal leaving the repeater;

transmitting said outgoing phase-modulated signal into the transmission path for propagation toward the receiving terminal without any further change, in said outgoing signal at the repeater so that the phase modulation of the outgoing signal is preserved even when the repeater is operating properly; and monitoring the phase modulation of the signal reaching the receiving terminal that is attributable to the addition of the pilot signal at the repeater.

2. A method according to claim 1 for use in a system having a plurality of additional repeaters in the transmission path in series with the one repeater and with one another, wherein said generating step includes providing the pilot signal of each of the repeaters with a unique frequency; and wherein said monitoring step includes also monitoring the phase modulation attributable to the addition of the pilot signal in each of the additional repeaters at the receiving terminal.

3. A method according to claim 1, said monitoring step including monitoring the signal strength attributable to the pilot signal at the receiving terminal; and further comprising the step of initiating an alarm when said signal strength exceeds a predetermined level.

4. A method according to claim 1, further including modulating the pilot signal to provide an auxiliary channel for supervision of the system.

5. A repeater for use in a communications transmission system in which signals propagate in a predetermined direction in a transmission path from a transmitting to a receiving terminal, comprising at least one component performing a non-linear function on the signal reaching the same in the transmission path;

means for generating a pilot signal and summing the same in the repeater at a point situated ahead of said one component as considered in the predetermined direction with the incoming signal propagating in the transmission path toward said repeater and having a predetermined frequency for combining with said incoming signal prior to the performance of the non-linear function on the combined signal in said one component, said pilot signal having such a frequency that said combined signal has a frequency component close to but different from said predetermined frequency, with attendant phase modulation of the outgoing signal leaving the repeater; and means for transmitting said outgoing phase-modulated signal into the transmission path for propagation toward the receiving terminal without any further change in said outgoing signal at said repeater so that the phase modulation of said outgoing signal is preserved even when the repeater is operating properly and for monitoring the phase of said outgoing phase modulation signal at the receiving terminal.

6. A repeater according to claim 5 wherein the summing means comprises a continuously running local oscillator located at the repeater.

7. A repeater according to claim 5 for use in an optical fiber communications system including an incoming optical fiber leading to the repeater; comprising an input photodetector and means for directing the light from the incoming optical fiber onto said photodetector; and wherein the summing means comprises a continuously running local oscillator having an output, a light source, means for digitally modulating the output of said light source, and means for applying the output of said light source to the input photodetector of the repeater.

8. A repeater according to claim 5 including means for modulating the pilot to provide an auxiliary channel for supervision of the system.

9. A communication transmission system comprising
means for forming a transmission path having a transmitting and a receiving terminal;
means for causing signals to propagate in said transmission path in a predetermined direction from said transmitting to said receiving terminal;
at least one repeater interposed in said transmission path and including
at least one component performing a non-linear function on the signals reaching the same in the transmission path,
means for generating a pilot signal and summing the same at the repeater at a point situated ahead of said one component as considered in the predetermined direction with the incoming signal propagating in the transmission path and having a predetermined frequency for combining with said incoming signal prior to the performance of the non-linear function on the combined signal in said one component, said pilot signal having such a frequency that said combined signal has a frequency component close to but different from said predetermined frequency, with attendant phase modulation of the outgoing signal leaving the repeater, and
means for transmitting said outgoing phase-modulated signal into said transmission path for propagation toward said receiving terminal without any further change in said outgoing signal at said repeater so that the phase modulation of said outgoing signal is preserved even when said repeater is operating properly; and
means for monitoring the phase modulation of the signal reaching said receiving terminal that is attributable to the addition of said pilot signal at said repeater.

10. An optical fiber communications transmission system, comprising
means for forming a transmission path having a transmitting and a receiving terminal;
means for causing signals to propagate in said transmission path in a predetermined direction from said transmitting to said receiving terminal;
at least one repeater interposed in said transmission path and including
at least one component performing a non-linear function on the signals reaching the same in the transmission path,
means for generating a pilot signal and summing the same at the repeater at a point situated ahead of said one component as considered in the predetermined direction with the incoming signal propagating in the transmission path and having a predetermined frequency for combining with said incoming signal prior to the performance of the non-linear function on the combined signal in said one component, said pilot signal having such a frequency that said combined signal has a frequency component close to but different from said predetermined frequency, with attendant phase modulation of the outgoing signal leaving the repeater, and
means for transmitting said outgoing phase-modulated signal into said transmission path for propagation toward said receiving terminal without any further change in said outgoing signal at said repeater so that the phase modulation of said outgoing signal is preserved even when said repeater is operating properly; and
means for monitoring the phase modulation of the signal reaching said receiving terminal that is attributable to the addition of said pilot signal at said repeater.

* * * * *